(12) United States Patent
Okudaira et al.

(10) Patent No.: US 8,903,615 B2
(45) Date of Patent: Dec. 2, 2014

(54) SPEED RATIO CONTROL DEVICE AND CONTROL METHOD FOR CONTINUOUSLY VARIABLE TRANSMISSION

(75) Inventors: Keita Okudaira, Zama (JP); Masato Koga, Hiratsuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/984,932

(22) PCT Filed: Dec. 2, 2011

(86) PCT No.: PCT/JP2011/077899
§ 371 (c)(1),
(2), (4) Date: Aug. 12, 2013

(87) PCT Pub. No.: WO2012/111216
PCT Pub. Date: Aug. 23, 2012

(65) Prior Publication Data
US 2013/0317713 A1    Nov. 28, 2013

(30) Foreign Application Priority Data
Feb. 15, 2011   (JP) .................................. 2011-30066

(51) Int. Cl.
G06F 7/00 (2006.01)
F16H 61/662 (2006.01)

(52) U.S. Cl.
CPC ........ *F16H 61/662* (2013.01); *F16H 61/66272* (2013.01)
USPC ................................. 701/60; 701/51; 477/37

(58) Field of Classification Search
USPC .............. 701/60–61, 51; 477/34, 37; 475/198
See application file for complete search history.

(56) References Cited

U.S. PATENT DOCUMENTS

| 6,217,469 B1 | 4/2001 | Sawada et al. |
| 2013/0289841 A1* | 10/2013 | Okudaira et al. ............... 701/61 |

FOREIGN PATENT DOCUMENTS

| JP | 11-037237 A | 2/1999 |
| JP | 2009-144751 A | 7/1999 |
| JP | 2004-076906 A | 3/2004 |
| JP | 2006-189079 A | 7/2006 |
| JP | 2009-144751 A | 7/2009 |

OTHER PUBLICATIONS

Japanese Office Action, Sep. 16, 2014, 3 pages.

* cited by examiner

*Primary Examiner* — Yonel Beaulieu
(74) *Attorney, Agent, or Firm* — Foley & Lardner LLP

(57) ABSTRACT

A continuously variable transmission (4) comprises an endless torque transmission member (13) looped around a pair of pulleys (11, 12). At least one of the pulleys changes a winding radius of the endless torque transmission member (13) in accordance with an applied pulley thrust. A controller (22) estimates a stretch amount of the endless torque transmission member (13) based on an operating state of the continuously variable transmission (4), sets a slip limit thrust based on the stretch amount, and controls the pulley thrusts based on the slip limit thrust. In this manner, appropriate pulley thrust control in accordance with whether or not the endless torque transmission member (13) stretches is realized.

6 Claims, 12 Drawing Sheets

41 ACCELERATOR-PEDAL DEPRESSION SENSOR
42 PRIMARY ROTATION SENSOR
43 SECONDARY ROTATION SENSOR
45 INHIBITOR SWITCH

41 ACCELERATOR-PEDAL DEPRESSION SENSOR
42 PRIMARY ROTATION SENSOR
43 SECONDARY ROTATION SENSOR
45 INHIBITOR SWITCH

SPEED RATIO CONTROL DEVICE AND CONTROL METHOD FOR CONTINUOUSLY VARIABLE TRANSMISSION

FIELD OF THE INVENTION

This invention relates to control of a pulley thrust of a continuously variable transmission using an endless torque transmission member such as a V-chain and a pair of pulleys.

BACKGROUND OF THE INVENTION

JP 2009-144751 A. published by the Japan Patent Office in 2009, proposes that, in a continuously variable transmission (CVT) for a vehicle, in which an endless torque transmission member such as a V-chain is looped around a pair of pulleys including a primary pulley and a secondary pulley, a speed change response is enhanced by appropriately setting a rigidity of the pulleys.

Each of the primary pulley and the secondary pulley changes a width of a V-shaped groove in accordance with a pulley thrust applied in a direction of a rotation axis to change a winding radius of the V-chain. In this manner, a ratio between rotation speeds of the pulleys, that is, a speed ratio is changed. The pulley thrusts are obtained by a hydraulic pressure of a hydraulic pump using an internal combustion engine mounted in a vehicle as a power source.

In the CVT described above, if a slip occurs between the V-chain and any one of the pulleys, torque transmission between the pulleys is adversely affected. In order to prevent the slip from occurring between the V-chain and the pulleys, a predetermined thrust is required to be applied to the pulleys. The predetermined thrust is hereinafter referred to as a slip limit thrust. The slip limit thrust is a value common to the primary pulley and the secondary pulley, and is determined depending on the winding radius of the V-chain around the primary pulley. The slip limit thrust is calculated by the following Expression (1).

$$F\min = \frac{Tp \cdot \cos\alpha}{2 \cdot \mu \cdot Rp} \quad (1)$$

where, Fmin=slip limit thrust,
Tp=input torque to primary pulley,
α=sheave angle,
μ=friction coefficient of V-chain and pulleys, and
Rp=winding radius of V-chain around primary pulley.

In this expression, the sheave angle α is a constant that is determined in advance by shapes and sizes of the primary pulley, the secondary pulley, and the V-chain. The friction coefficient μ is a constant, which is determined in advance by materials of the primary pulley, the secondary pulley, and the V-chain.

Figure 11:
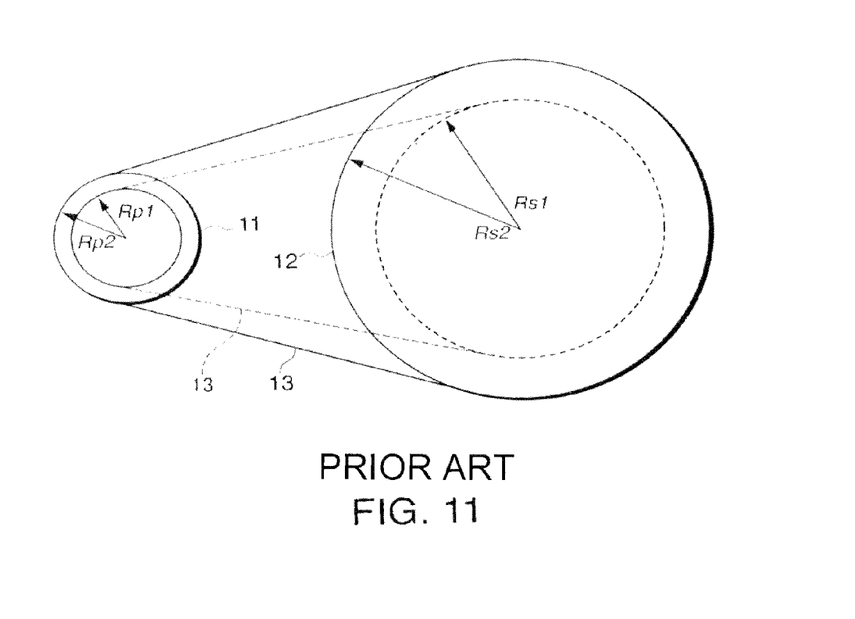
FIG. 11 is a schematic side view of the V-chain looped around the primary pulley and the secondary pulley, for illustrating a change in each winding radius due to the stretch of the V-chain.

Referring to FIG. 11, in the CVT that transmits torque through the V-chain, when the V-chain stretches, the winding radii around the pulleys change at the same speed ratio. The following Expression (2) expresses the relationship between the speed ratio and the winding radii.

$$ip = \frac{Rs1}{Rp1} = \frac{Rs2}{Rp2} \quad (2)$$

where, ip=speed ratio,
Rp1=winding radius around primary pulley when stretch of V-chain is small,
Rs1=winding radius around secondary pulley when stretch of V-chain is small,
Rp2=winding radius around primary pulley when stretch of V-chain is large, and
Rs2=winding radius around secondary pulley when stretch of V-chain is large.

As can be understood from Expression (1), when the V-chain stretches, the winding radius of the V-chain around each of the pulleys increases. As a result, the slip limit thrust becomes smaller.

Therefore, if the pulley thrusts are controlled based on the slip limit thrust that is calculated without taking the stretch of the V-chain into consideration, the pulley thrusts become excessively large in the case where the V-chain stretches. As a result, a loss in hydraulic pressure or a friction loss increases, which leads to an increase in fuel consumption of the internal combustion engine, which drives the hydraulic pump.

It is therefore an object of this invention to realize appropriate pulley thrust control in accordance with whether or not an endless torque transmission member stretches.

SUMMARY OF THE INVENTION

A speed ratio control device according to this invention is applied to a continuously variable transmission comprising an endless torque transmission member looped around a pair of pulleys. One of the pulleys has a movable sheave configured to displace in an axial direction in accordance with an applied pulley thrust to change a winding radius of the endless torque transmission member. The speed ratio control device comprises a sensor that detects an operating state of the continuously variable transmission and a programmable controller. The programmable controller is programmed to calculate a stretch amount of the endless torque transmission member based on the operating state of the continuously variable transmission, and a slip limit thrust in accordance with the stretch amount, and control the pulley thrust of the one of pulleys based on the slip limit thrust.

The details as well as other features and advantages of this invention are set forth in the remainder of the specification and are shown in the accompanying drawings.

DESCRIPTION OF THE PREFERRED EMBODIMENTS

Figure 1:
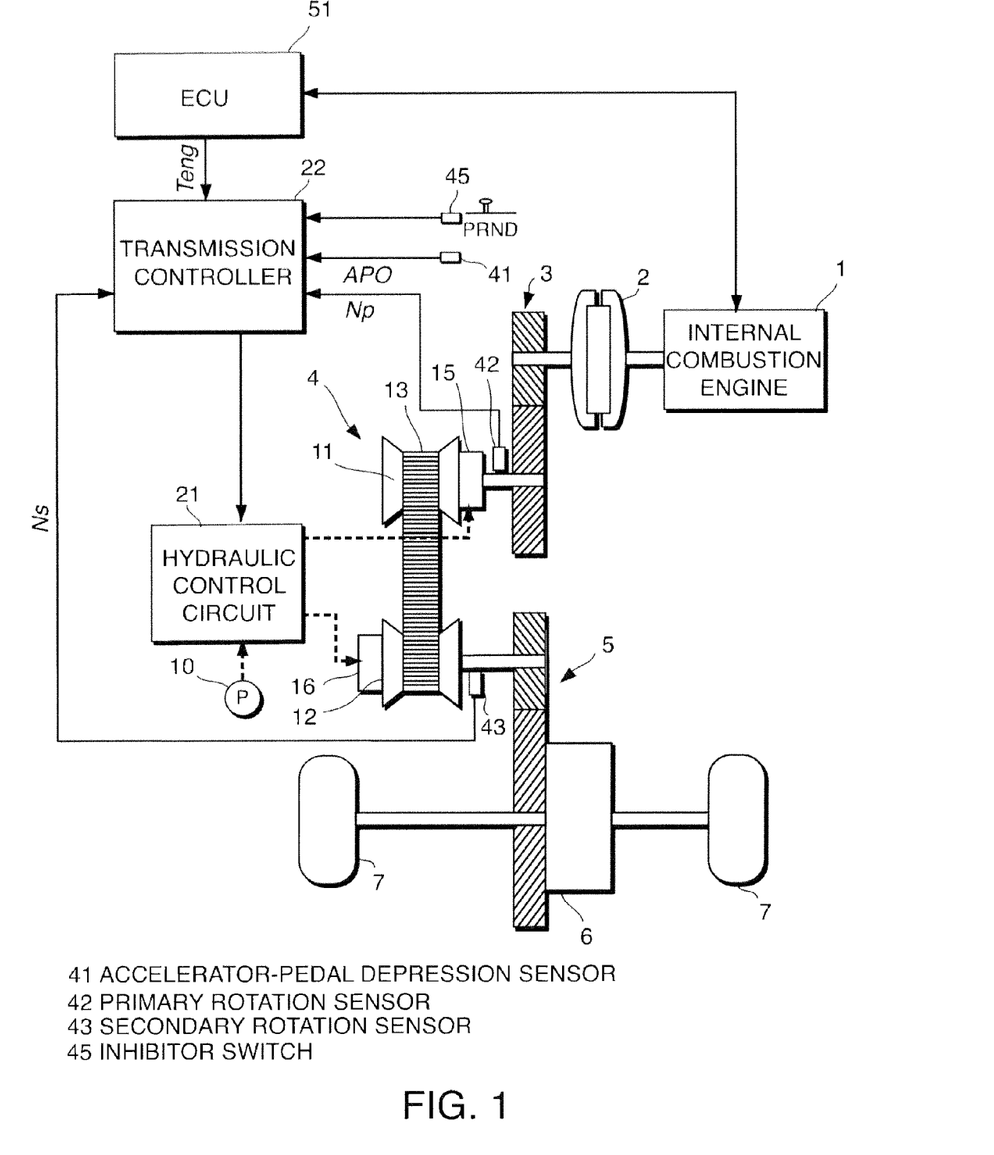
FIG. 1 is a schematic diagram of a speed ratio control device for a continuously variable transmission according to an embodiment of this invention.

Referring to FIG. 1 of the drawings, a vehicle driving system comprises an internal combustion engine 1 as a running power source. Rotation of the internal combustion engine 1 is output to drive wheels 7 via a torque converter 2, a first gear train 3, a continuously variable transmission (hereinafter referred to as "CVT") 4, a second gear train 5, and a final reduction gear 6.

The CVT 4 is constituted by a chain-type continuously variable transmission mechanism.

The CVT 4 comprises a primary pulley 11, a secondary pulley 12, and a V-chain 13 as an endless torque transmission member looped around the pulleys 11 and 12. The V-chain 13 has a V-shaped cross section having a width gradually decreasing toward the center of the V-chain 13.

Figure 2:
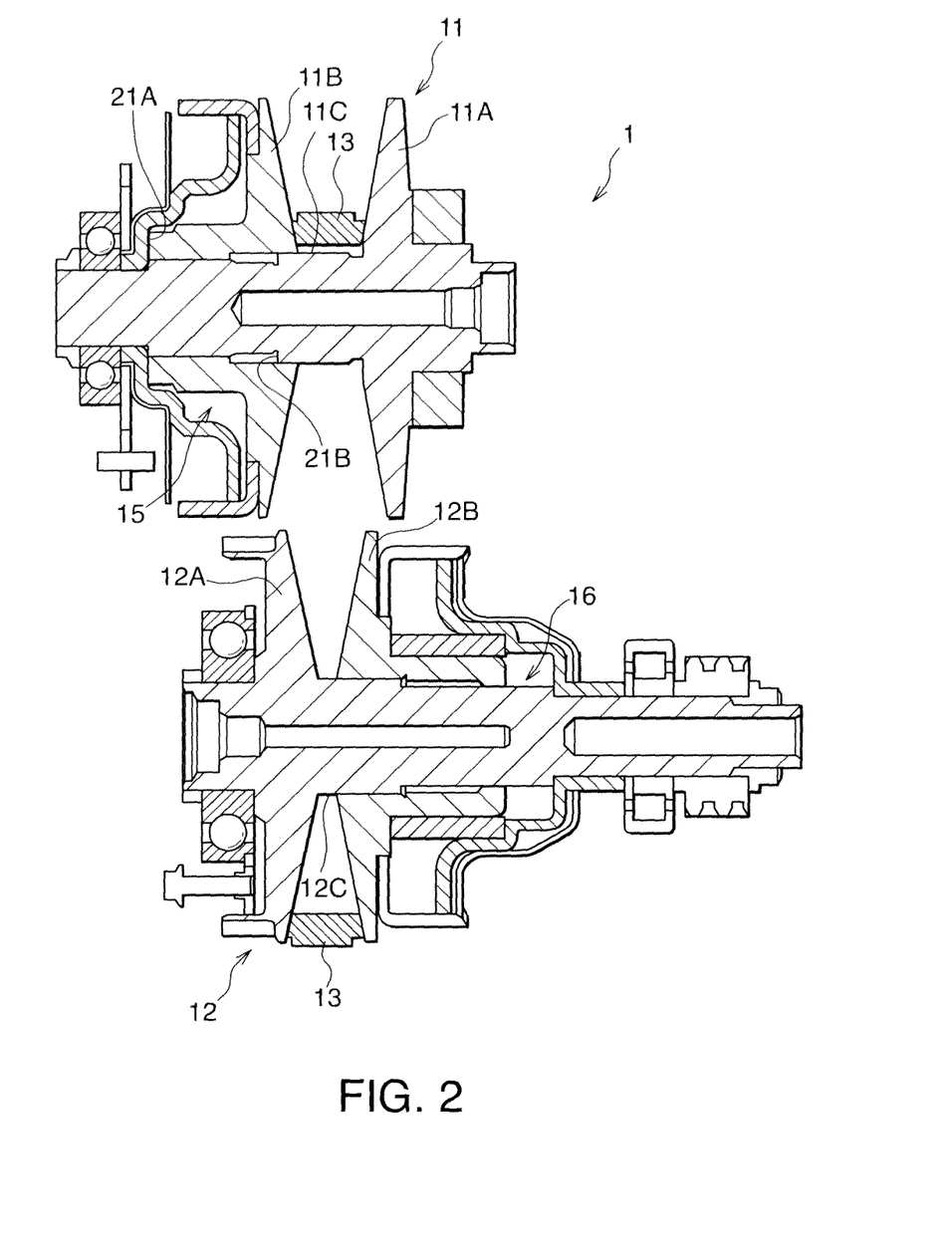
FIG. 2 is a horizontal sectional view of the continuously variable transmission.

Referring to FIG. 2, the primary pulley 11 of the CVT 4 includes a fixed sheave 11A and a movable sheave 11B. The fixed sheave 11A includes a pulley shaft 11C. The movable sheave 11B is supported on an outer circumference of the pulley shaft 11C so as to be slidable in an axial direction. The movable sheave 11B changes a distance from the fixed sheave 11A on the pulley shaft 11C by a pulley thrust applied by a hydraulic cylinder 15 in the axial direction, thereby changing a winding radius of the V-chain 13.

The secondary pulley 12 includes a fixed sheave 12A and a movable sheave 12B. The fixed sheave 12A includes a pulley shaft 12C. The movable sheave 12B is supported on an outer circumference of the pulley shaft 12C so as to be slidable in the axial direction. The movable sheave 12B changes a distance from the fixed sheave 12A on the pulley shaft 12C by a pulley thrust applied by a hydraulic cylinder 16 in the axial direction, thereby changing a winding radius of the V-chain 13.

The CVT 4 changes the winding radii of the V-chain 13 around the primary pulley 11 and the secondary pulley 12 in the above-mentioned manner to continuously change a speed ratio. The "speed ratio" is a value obtained by dividing an input rotation speed of the CVT 4 by an output rotation speed of the CVT 4.

The primary pulley 11 is provided with pulley stoppers 21A and 21B. A portion of the movable sheave 11B that comes into abutment against the V-chain 13 is referred to as a "distal end", whereas an end portion on the opposite side is referred to as a "rear end". The pulley stopper 21A is provided inside the hydraulic cylinder 15 and comes into abutment against the rear end of the movable sheave 11B so as to limit a displacement of the movable sheave 11B away from the fixed sheave 11A. The pulley stopper 21B is formed in a step-like shape on the outer circumference of the pulley shaft 12C of the fixed sheave 11A. On an inner circumference of the movable sheave 11B, a corresponding step is formed. The step of the movable sheave 11B comes into abutment against the pulley stopper 12B, which limits a displacement of the movable sheave 11B towards the fixed sheave 11A.

The pulley stoppers 21A and 21B may be provided to the secondary pulley 12. The pulley stoppers 21A and 21B have the following functions. Specifically, (1) the pulley stopper 21A prevents the V-chain 13 from coming into contact with the pulley shaft 11C (12C); and
(2) the pulley stopper 21B prevents the V-chain 13 from coming off from a V-groove of the pulley 11 (12).

The function (1) is required in the vicinity of a maximum speed ratio in the case of the primary pulley 11 and in the vicinity of a minimum speed ratio in the case of the secondary pulley 12.

The function (2) is required in the vicinity of the minimum speed ratio in the case of the primary pulley 11 and in the vicinity of the maximum speed ratio in the case of the secondary pulley 12.

The case where the pulley stoppers 21A and 22B are provided to the primary pulley 11 will be described.

In the vicinity of the maximum speed ratio, the rear end of the movable sheave 11B comes into abutment against the pulley stopper 21A to define a minimum value of the winding radius of the V-chain 13 around the primary pulley 11. The position of the pulley stopper 21A is set so that a width of a portion having the shortest groove width formed by the fixed sheave 11A and the movable sheave 11B becomes smaller than a width of an inner circumference of the V-chain 13 in a state in which the rear end of the movable sheave 11B abuts against the pulley stopper 21A, thereby preventing the V-chain 13 from coming into contact with the pulley shaft 11C.

In the vicinity of the minimum speed ratio, the step formed on the inner circumference of the movable sheave 11B comes into abutment against the step-like pulley stopper 21B formed on the outer circumference of the pulley shaft 11C to define a maximum value of the winding radius of the V-chain 13 around the primary pulley 11. At this time, the radius of a sheave surface is designed in advance in consideration of the stretch of the V-chain 13 so that the V-chain 13 does not come off from the groove formed by the fixed sheave 11A and the movable sheave 11B even if the V-chain 13 stretches.

A case where the pulley stoppers 21A and 21B are provided to the secondary pulley 12 will be described.

In the vicinity of the minimum speed ratio, the rear end of the movable sheave 12B comes into abutment against the pulley stopper 21A to define a minimum value of the winding radius of the V-chain 13 around the secondary pulley 12. The position of the pulley stopper 21A is set so that a width of a portion having the shortest groove width formed by the fixed sheave 12A and the movable sheave 12B becomes smaller than a width of the inner circumference of the V-chain 13 in a state in which the rear end of the movable sheave 12B abuts against the pulley stopper 21A, thereby preventing the V-chain 13 from coming into contact with the pulley shaft 12C.

In the vicinity of the maximum speed ratio, the step formed on the inner circumference of the movable sheave 12B comes into abutment against the step-like pulley stopper 21B formed on the outer circumference of the pulley shaft 12C to define a maximum value of the winding radius of the V-chain 13 around the secondary pulley 12. At this time, the radius of a sheave surface is designed in advance in consideration of the stretch of the V-chain 13 so that the V-chain 13 does not come off from the groove formed by the fixed sheave 12A and the movable sheave 12B even if the V-chain 13 stretches.

The pulley stoppers 21A and 21B may be provided to any one of the primary pulley 11 and the secondary pulley 12. In this embodiment, the pulley stoppers 21A and 21B are provided to the primary pulley 11, whereas a pulley stopper is not provided to the secondary pulley 12.

Referring again to FIG. 1, the transmission control of the CVT 4 is performed by a hydraulic pump 10 driven by using a part of power of the internal combustion engine 1, a hydraulic control circuit 21 for supplying hydraulic pressures to the hydraulic cylinders 15 and 16 of the continuously variable transmission 4 after regulating a hydraulic pressure from the hydraulic pump 10, and a transmission controller 22 for controlling the hydraulic control circuit 21.

The transmission controller 22 is constituted by a microcomputer including a central processing unit (CPU), a read-only memory (ROM), a random-access memory (RAM), and an input/output interface (I/O interface). The controller may be constituted by a plurality of microcomputers.

To the transmission controller 22, detection data is input as signals from an accelerator-pedal depression sensor 41 for detecting an opening degree APO of an accelerator pedal provided to the vehicle as a load of the internal combustion engine 1, an inhibitor switch 45 for detecting a selected position of a selector lever provided to the vehicle, a primary rotation sensor 42 for detecting a rotation speed Np of the primary pulley 11, and a secondary rotation sensor 43 for detecting a rotation speed Ns of the secondary pulley 12.

Figure 3:
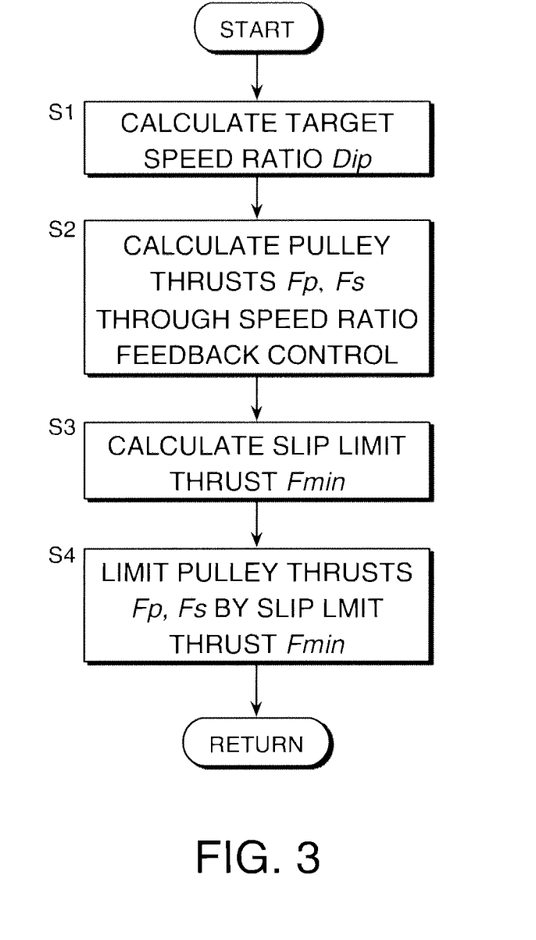
FIG. 3 is a flowchart illustrating a transmission control routine executed by a transmission controller according to the embodiment of this invention.

Referring to FIG. 3, a transmission control routine for the CVT 4, executed by the transmission controller 22, will be described. The routine is repeatedly executed at constant intervals of, for example, ten milliseconds, during the rotation of the primary pulley 11.

In a step S1, the transmission controller 22 calculates a target speed ratio Dip by a known method based on the load of the internal combustion engine 1 and a vehicle speed VSP. As the load of the internal combustion engine 1, the accelerator-pedal opening degree APO detected by the accelerator-pedal depression sensor 41 is used. The vehicle speed VSP is calculated from the rotation speed Ns of the secondary pulley 12 and a gear ratio of the second gear train 5 and the final reduction gear 6.

In a step S2, by known speed ratio feedback control based on a deviation between the target speed ratio Dip and an actual speed ratio ip, a pulley thrust Fp for the primary pulley 11 and a pulley thrust Fs for the secondary pulley 12 are calculated.

In a step S3, the transmission controller 22 calculates a slip limit thrust Fmin. This processing is subsequently described in detail.

When the hydraulic pressures supplied to the hydraulic cylinders 15 and 16 are changed, the movable sheave 11B changes the distance from the fixed sheave 11A on the pulley shaft 11C by the pulley thrust applied by the hydraulic cylinder 15 to the movable sheave 11B, thereby changing a winding radius Rp of the V-chain 13. The movable sheave 12B changes the distance from the fixed sheave 12A on the pulley shaft 12C by the pulley thrust applied by the hydraulic cylinder 16 to the movable sheave 12B, thereby changing a winding radius Rs of the V-chain 13.

If a substantial slip occurs between the V-chain 13 and the pulley 11 or 12, the torque transmission is adversely affected. The meaning of the term "substantial slip" is as follows. Even during normal torque transmission, the V-chain 13 causes an extremely small slip with respect to each of the primary pulley 11 and the secondary pulley 12. For the distinction from the extremely small slip described above, the slip of the V-chain 13 that adversely affects the torque transmission is referred to as "substantial slip".

In order to prevent the substantial slip from occurring between the V-chain 13 and the pulley 11 or 12, the hydraulic pressures of the hydraulic cylinders 15 and 16, which apply the pulley thrusts to the pulleys 11 and 12, may be increased. To increase the hydraulic pressures, however, a discharge pressure of the hydraulic pump 10 for supplying the hydraulic pressures to the hydraulic cylinders 15 and 16 is required to be increased. As a result, a loss in hydraulic pressure or a friction loss in a hydraulic-pressure supply system increases, which leads to an increase in fuel consumption of the internal combustion engine 1 which drives the hydraulic pump 10.

Therefore, in the step S3, the transmission controller 22 calculates a minimum value of the pulley thrust, which does not cause the substantial slip of the V-chain 13 with respect to the actual speed ratio ip, as the slip limit thrust Fmin. The slip limit thrust Fmin is a value common to the primary pulley 11 and the secondary pulley 12. The transmission controller 22 minimizes energy consumption caused by a transmission operation of the CVT 4 by calculating the slip limit thrust Fmin in consideration of the stretch of the V-chain 13.

Processing in the step S3 will be described in detail below.

In order to prevent the endless torque transmission member such as the V-chain wound around the pulleys from causing the substantial slip with respect to the pulleys, a thrust equal to or greater than the slip limit thrust is required to be applied to each of the pulleys.

Next, a basic logic of the calculation of the slip limit thrust will be described.

When the stretch of the V-chain 13 is not taken into consideration, the winding radius Rp of the V-chain 13 around the primary pulley 11 can be geometrically calculated with respect to the actual speed ratio ip. Therefore, if the stretch of the V-chain 13 is not taken into consideration, the slip limit thrust Fmin can be directly calculated by Expression (1) using the value of the winding radius.

However, if the pulley thrust Fs for the secondary pulley 12 is set so as to be equal to or greater than the slip limit thrust Fmin calculated in the above-mentioned manner, the following problem occurs.

Specifically, when the V-chain 13 stretches, the winding radius Rp of the V-chain 13 around the primary pulley 11 increases. As a result, the slip limit thrust Fmin becomes smaller.

In this case, if the pulley thrust Fs for the secondary pulley 12 is set by using the slip limit thrust Fmin calculated without taking the stretch of the V-chain 13 into consideration, the pulley thrust Fs becomes excessively large. As a result, a loss in hydraulic pressure or a friction loss increases, which leads to an increase in fuel consumption of the internal combustion engine 1 that drives the hydraulic pump 10.

In this embodiment, the slip limit thrust Fmin is calculated in consideration of the stretch of the V-chain 13. When the V-chain 13 stretches, the winding radius Rp of the V-chain 13 around the primary pulley 11 increases. As can be understood from Expression (1), when the winding radius Rp increases, the slip limit thrust Fmin decreases. The decrease of the slip limit thrust Fmin lowers a tension of the V-chain 13. Consequently, a stretch amount of the V-chain 13 is decreased. When the V-chain 13 stretches as described above, the slip limit thrust Fmin cannot be calculated without a convergence calculation.

Figure 4:
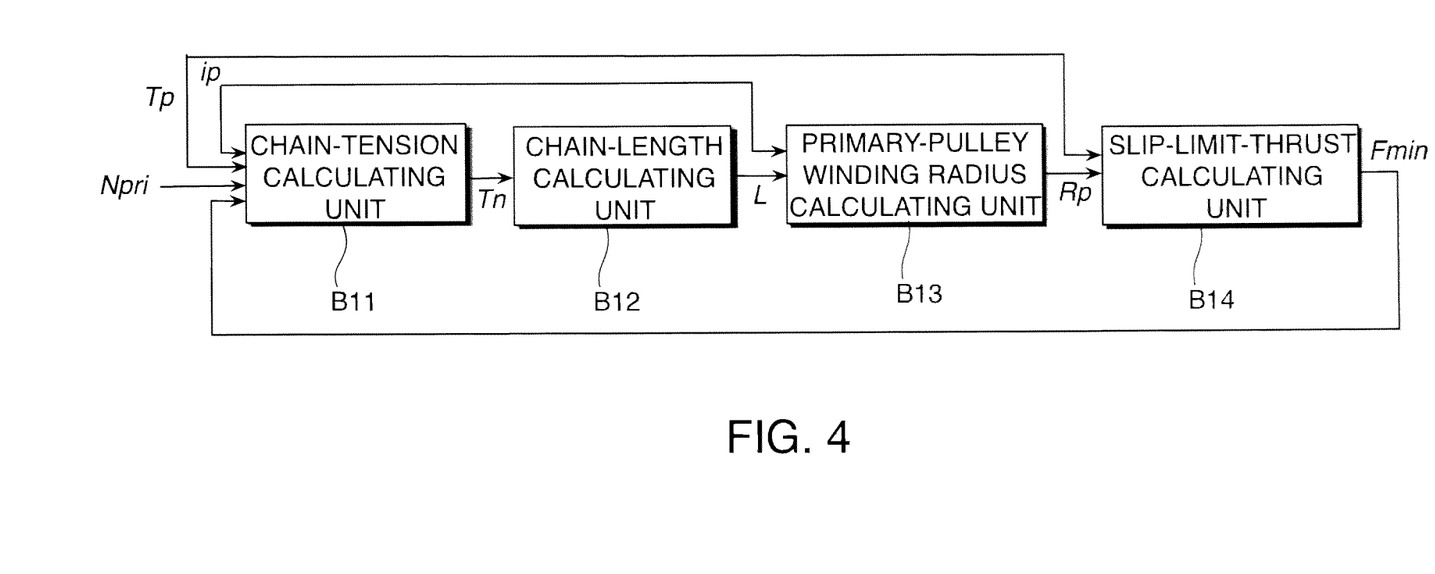
FIG. 4 is a block diagram illustrating a convergence calculation of a slip limit thrust by the transmission controller.

The transmission controller 22 performs the convergence calculation of the slip limit thrust Fmin by a calculation logic illustrated in FIG. 4.

Referring to FIG. 4, the transmission controller 22 comprises a chain-tension calculating unit B11, a chain-length calculating unit B12, a primary-pulley winding radius-calculating unit B13, and a slip-limit-thrust calculating unit B14. All of the blocks shown in FIG. 4 are virtual units illustrating the function of the transmission controller 22 for calculating the slip limit thrust Fmin, and do not exist as physical entities. ]

To the chain-tension calculating unit B11, an input torque Tp to the primary pulley 11, the actual speed ratio ip, the rotation speed Np of the primary pulley 11, and the slip limit thrust Fmin are input.

Here, the input torque Tp to the primary pulley 11 is calculated by a known method, for example, disclosed in JP 08-200461 A and JP 2002-106705 A, based on an engine torque Teng input from an engine control unit (ECU) 51 illustrated in FIG. 1, a lock-up state of the torque converter 2, and an inertia torque of power transmission members from the internal combustion engine 1 to the primary pulley 11.

The rotation speed Np of the primary pulley 11 is a value detected by the primary rotation sensor 42. The actual speed ratio ip is calculated as a ratio of the rotation speed Np of the primary pulley 11, which is detected by the primary rotation sensor 42, and the rotation speed Ns of the secondary pulley 12, which is detected by the secondary rotation sensor 43.

The slip limit thrust Fmin is a value calculated by the slip-limit-thrust calculating unit B14. The transmission controller 22 performs the convergence calculation by inputting the slip limit thrust Fmin calculated by the slip-limit-thrust calculating unit B14 to the chain-tension calculating unit B11 again.

An initial value of the slip limit thrust Fmin is set, for example, as follows. Specifically, a winding radius Rp0 around the primary pulley 11 is calculated from a chain length L0 without stretch and the speed ratio of the primary pulley 11 and the secondary pulley 12. Then, a slip limit thrust calculated from the winding radius Rp0 and the input torque Tp to the primary pulley 11 is used as an initial value of the slip limit thrust Fmin. The initial value of the slip limit thrust Fmin can also be set by another method.

The chain-tension calculating unit B11 calculates a chain tension Tn from the input torque Tp to the primary pulley 11, the slip limit thrust Fmin, the pulley thrust Fp for the primary pulley 11, the rotation speed Np of the primary pulley 11, and the actual speed ratio ip.

Figure 6:
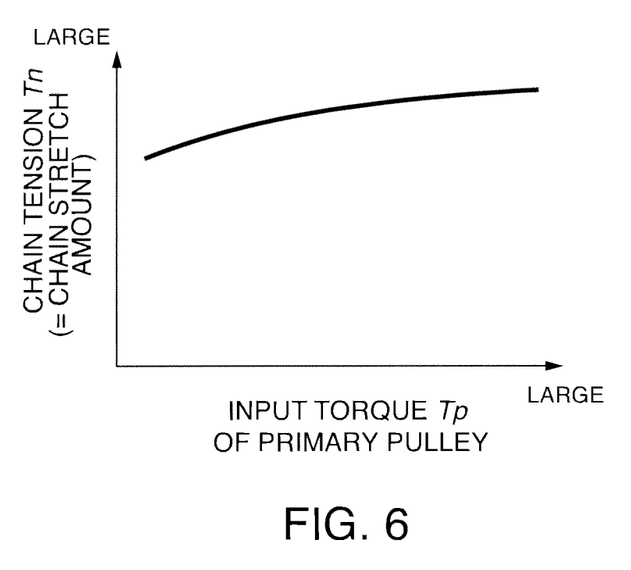
FIG. 6 is a diagram illustrating a relationship between an input torque to a primary pulley of the continuously variable transmission and a tension of a V-chain by a simulation conducted by the inventors of this invention.

Referring to FIG. 6, the chain tension Tn of the V-chain 13 has a characteristic of gently increasing as the input torque Tp of the primary pulley 11 increases when the actual speed ratio ip of the primary pulley 11 and the secondary pulley 12, the pulley thrust for the secondary pulley 12, and the rotation speed Np of the primary pulley 11 are constant. The thrust Fs for the secondary pulley 12 and the thrust Fp for the primary pulley 11 have a constant relationship based on the actual speed ratio ip.

Figure 7:
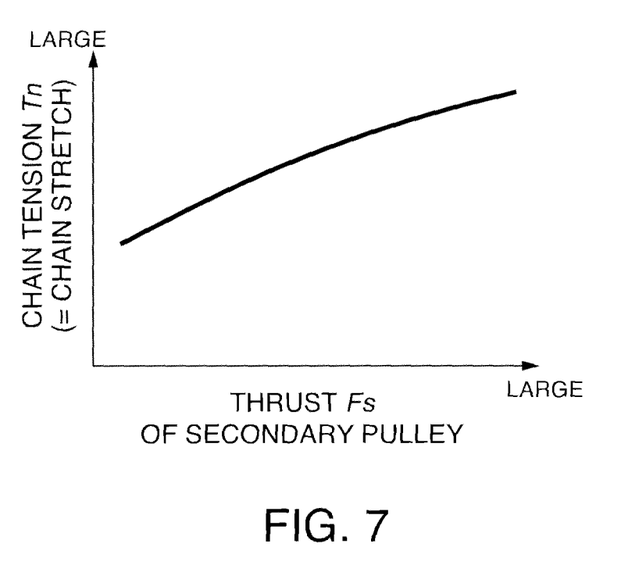
FIG. 7 is a diagram illustrating a relationship between a thrust to a secondary pulley of the continuously variable transmission and the tension of the V-chain by a simulation conducted by the inventors of this invention.

Referring to FIG. 7, the chain tension Tn of the V-chain 13 increases as the pulley thrust Fs for the secondary pulley 12 increases, when the input torque Tp to the primary pulley 11, the rotation speed Np thereof, and the actual speed ratio ip of the primary pulley 11 and the secondary pulley 12 are constant.

Figure 8:
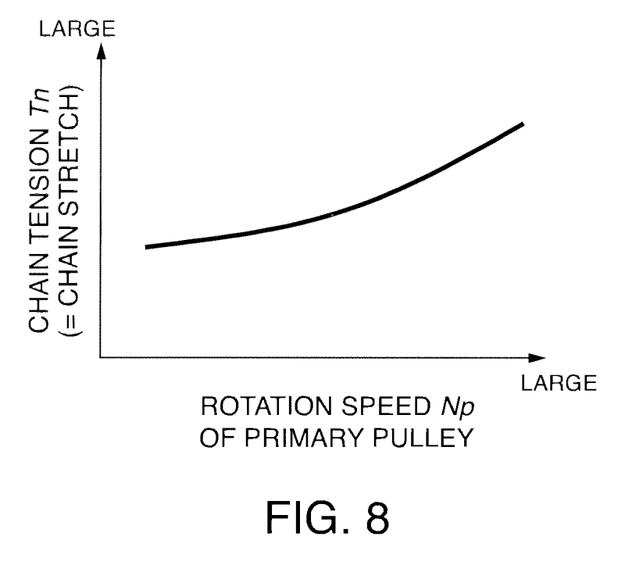
FIG. 8 is a diagram illustrating a relationship between a rotation speed of the primary pulley and the tension of the V-chain by a simulation conducted by the inventors of this invention.

Referring to FIG. 8, the chain tension Tn of the V-chain 13 increases as the rotation speed Np of the primary pulley 11 becomes higher, when the input torque Tp to the primary pulley 11, the pulley thrust Fs for the secondary pulley 12, and the actual speed ratio ip are constant.

Figure 9:
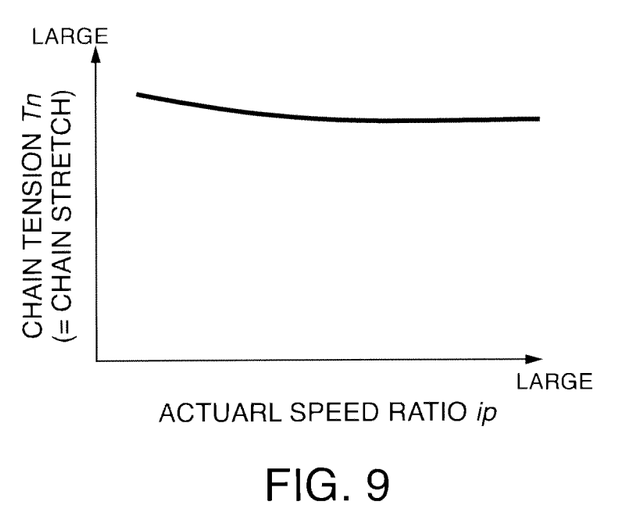
FIG. 9 is a diagram illustrating a relationship between a speed ratio and the tension of the V-chain by a simulation conducted by the inventors of this invention.

Referring to FIG. 9, the chain tension Tn of the V-chain 13 tends to slightly decrease as the actual speed ratio ip of the primary pulley 11 and the secondary pulley 12 increases, when the pulley thrust Fs for the secondary pulley 12, the input torque to the primary pulley 11, and the rotation speed Np of the primary pulley 11 are constant.

Based on the characteristics described above, a four-dimensional map of the chain tension Tn, which has the input torque Tp to the primary pulley 11, the pulley thrust Fs for the secondary pulley 12, the actual speed ratio ip, and the rotation speed Np of the primary pulley 11 as parameters indicating an operating state of the CVT 4, can be created. In the ROM of the transmission controller 22, the thus created four-dimensional map of the chain tension Tn is stored in advance. The chain-tension calculating unit B11 obtains the chain tension Tn based on the input data by referring to the four-dimensional map of the chain tension Tn stored in the ROM.

The chain-length calculating unit B12 obtains a chain stretch amount from the chain tension Tn and then adds the chain stretch amount to the chain length without stretch to calculate a chain length L. The relationship between the chain tension Tn and the chain stretch amount is determined experimentally in advance. The chain length without stretch is a known value.

The primary-pulley winding radius calculating unit B13 calculates the winding radius Rp of the V-chain 13 around the primary pulley 11 (hereinafter referred to as "primary-pulley winding radius Rp") from the chain length L, a distance dis between the pulley shafts, and the actual speed ratio ip. The distance dis between the pulley shafts is a fixed value indicating a distance between the rotation axis of the primary pulley 11 and the rotation axis of the secondary pulley 12. The primary-pulley winding radius calculating unit B13 calculates the primary-pulley winding radius Rp by a geometrical calculation. Alternatively, a map of the primary-pulley winding radius Rp, which has the chain length L and the actual speed ratio ip as parameters, is stored in advance in the ROM of the transmission controller 22. A search is made through the map using the chain length L and the target speed ratio Dip to calculate the primary-pulley winding radius Rp.

When the pulley stopper 21A is provided to the primary pulley 11, the primary-pulley winding radius Rp in the vicinity of the maximum speed ratio does not become smaller than a minimum value corresponding to the position of the pulley stopper 21A. When the primary-pulley winding radius Rp smaller than the minimum value is calculated in the calculation, the primary-pulley winding radius calculating unit B13 corrects the primary-pulley winding radius Rp to the minimum value.

It is preferred that the primary-pulley winding radius calculating unit B13 prevents the winding radius Rp around the primary pulley 11 from becoming smaller than the minimum value in terms of prevention of the value of the slip limit thrust Fmin from being calculated to be excessively large.

Moreover, when the pulley stopper 21B is provided to the primary pulley 11, the winding radius Rp around the primary pulley 11 in the vicinity of the minimum speed ratio does not become greater than a maximum value corresponding to the position of the pulley stopper 21B. When the winding radius Rp around the primary pulley 11 greater than the maximum value is calculated in the calculation, the primary-pulley winding radius calculating unit B13 corrects the winding radius Rp around the primary pulley 11 to the maximum value.

It is preferred that the primary-pulley winding radius calculating unit B13 restrict the primary-pulley winding radius Rp to the maximum value or smaller in terms of prevention of the value of the slip limit thrust Fmin from being calculated to be excessively small.

The limitation of the winding radius Rp around the primary pulley 11 to the minimum value and the maximum value can also be realized by limiting a map value of the map of the primary-pulley winding radius Rp in advance.

The slip-limit-thrust calculating unit B14 calculates the slip limit thrust Fmin by using Expression (1) based on the input torque Tp to the primary pulley 11, the primary-pulley winding radius Rp calculated by the primary-pulley winding radius calculating unit B13, and a friction coefficient μ and a sheave angle α, which are fixed values.

The slip limit thrust Fmin calculated by the slip-limit-thrust calculating unit B14 is input again to the chain-tension calculating unit B11 so that the chain tension Tn is recalculated. Further, the chain length L, the primary-pulley winding radius Rp, and the slip limit thrust Fmin are respectively recalculated in the chain-length calculating unit B12, the primary-pulley winding radius calculating unit B13, and the slip-limit-thrust calculating unit B14.

The transmission controller 22 repeats the processing of the blocks B11 to B14 to perform the convergence calculation. As a result of the convergence calculation, the slip limit thrust Fmin corresponding to the actual speed ratio ip is obtained.

From Expression (1), it is understood that the slip limit thrust Fmin becomes smaller as the primary-pulley winding radius Rp becomes greater and that the primary-pulley winding radius Rp becomes greater as the slip limit thrust Fmin becomes smaller.

Figure 5A:
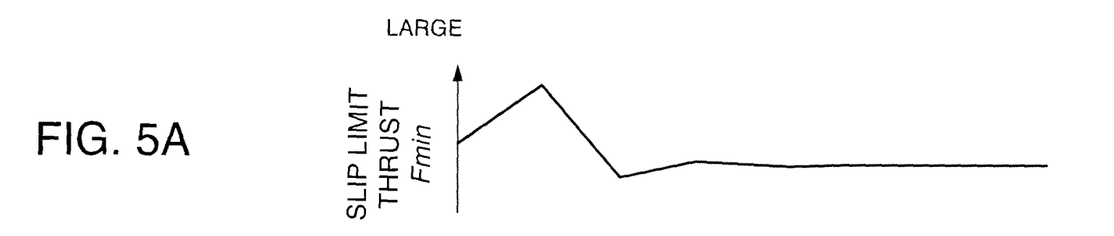
FIGS. 5A and 5B are timing charts illustrating a state of convergence of a winding radius and the slip limit thrust.
Figure 5B:
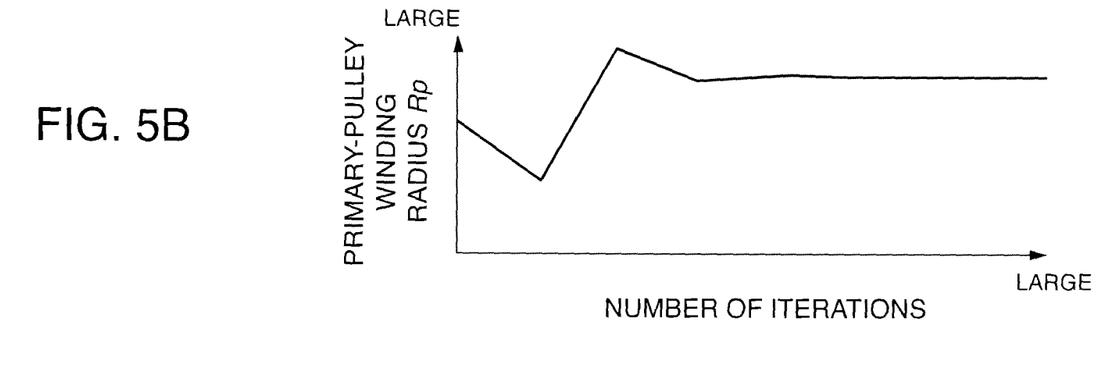

Referring to FIGS. 5A and 5B, in a process of convergence in the convergence calculation described above, the slip limit thrust Fmin and the primary-pulley winding radius Rp converge while one increases and the other decreases.

When the movable sheave 11B of the primary pulley 11 abuts against the pulley stopper 21B, it is preferred in terms of reduction in calculation load to fix the slip limit thrust Fmin to a value at the time when the primary pulley 11 comes into abutment against the pulley stopper 21B as long as the abutment state is maintained. Similarly, when the movable sheave 11B of the primary pulley 11 abuts against the pulley stopper 21A, it is preferred in terms of reduction in calculation load to fix the slip limit thrust Fmin to a value at the time when the primary pulley 11 comes into abutment against the pulley stopper 21A as long as the abutment state is maintained.

Referring to FIG. 3 again, in a step S4, the transmission controller 22 imposes a limitation with the slip limit thrust Fmin to the pulley thrust Fp for the primary pulley 11 and the pulley thrust Fs for the secondary pulley 12, which are calculated in the step S2. Further, the hydraulic pressures to be supplied to the hydraulic cylinders 15 and 16, which correspond to the limited value, are instructed to the hydraulic control circuit 21.

Figure 10A:
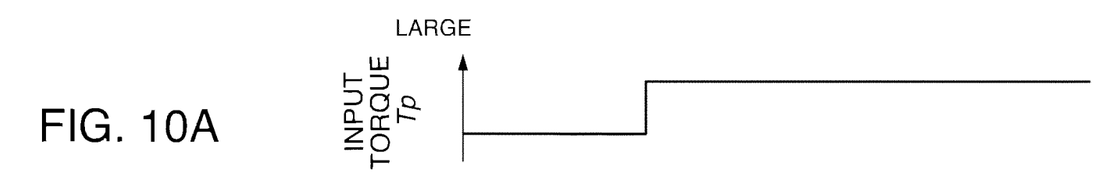
FIGS. 10A to 10D are timing charts illustrating a state of setting of the slip limit thrust by the transmission controller in consideration of stretch of the V-chain.
Figures 10B, 10C:
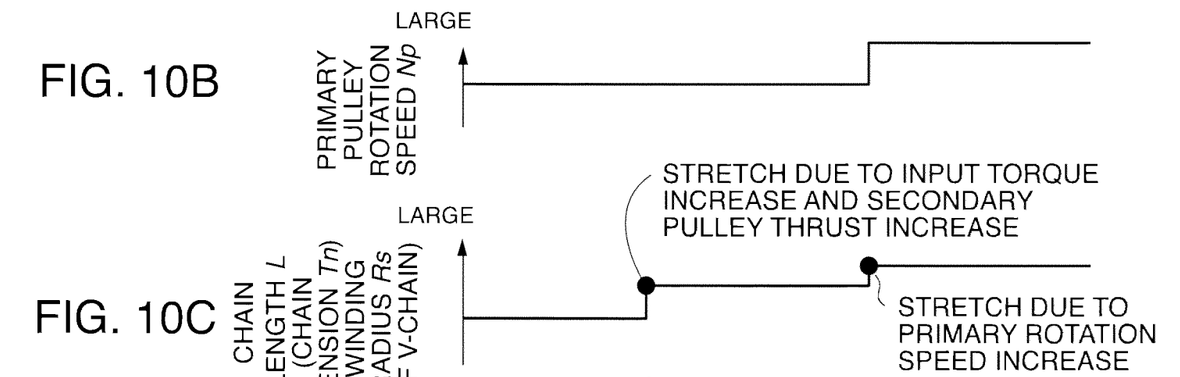

Referring to FIGS. 10A to 10D, the actions provided by the speed ratio control device described above will be specifically described. Consider the case where the input torque Tp to the primary pulley 11 of the CVT 4 increases at time t1 as illustrated in FIG. 10A and the rotation speed Np of the primary pulley 11 increases at time t2 as illustrated in FIG. 10B in a state in which the actual speed ratio ip is maintained in the vicinity of the minimum speed ratio.

Figure 10D:
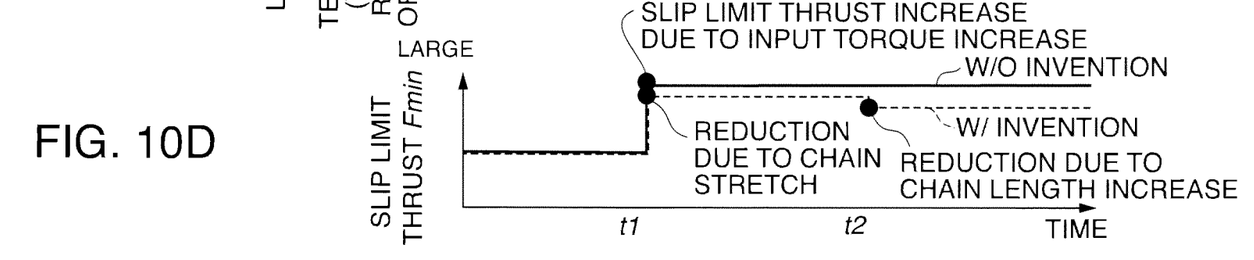

When the input torque Tp to the primary pulley 11 increases at time t1, the slip limit thrust Fmin calculated by Expression (1) increases as indicated by a solid line in FIG. 10D. When the input torque Tp to the primary pulley 11 increases, the chain tension Tn of the v-chain 13 also increases as illustrated in FIG. 6. The increase in the chain tension Tn increases the chain length L as illustrated in FIG. 10C. With the increase in the chain length L, the primary-pulley winding radius Rp also increases. The increase in the primary-pulley winding radius Rp brings about a decrease in the slip limit thrust Fmin, as expressed by Expression (1).

When the stretch of the V-chain 13 is not taken into consideration, the slip limit thrust Fmin maintains a constant value, as indicated by the solid line in FIG. 10D.

Further, when the rotation speed Np of the primary pulley 11 increases at time t2, the chain tension. Tn of the V-chain 13 also increases as illustrated in FIG. 8. The increase in the chain tension Tn further increases the chain length L, as illustrated in FIG. 10C. The further increase in the chain length L further increases the primary-pulley winding radius Rp. The further increase in the primary-pulley winding radius Rp brings about a further decrease in the slip limit thrust Fmin, as expressed by Expression (1).

On the other hand, when the stretch of the V-chain 13 is not taken into consideration, the slip limit thrust Fmin maintains a constant value also after time t2, as indicated by the solid line in FIG. 10D.

The pulley thrust Fs for the secondary pulley 12 is set equal to the slip limit thrust Fmin. Based on the pulley thrust, the thrust Fp of the primary pulley 11 is calculated. After time t1, the slip limit thrust Fmin calculated in consideration of the stretch of the V-chain 13 is smaller than the slip limit thrust Fmin calculated without taking the stretch of the V-chain into consideration. Therefore, the thrust Fs of the secondary pulley determined based on the slip limit thrust Fmin is a value in consideration of the stretch of the V-chain 13 and is reduced to be smaller than that in the case where the stretch of the V-chain 13 is not taken into consideration.

Therefore, the hydraulic pressure supplied to the hydraulic cylinder 16, which applies the pulley thrust to the secondary pulley 12, can be reduced. The primary thrust Fp calculated based on the secondary thrust Fs is also reduced to be smaller than that in the case where the stretch of the V-chain 13 is not taken into consideration. Therefore, the hydraulic pressure supplied to the hydraulic cylinder 15, which applies the pulley thrust to the primary pulley 11, can also be reduced. As a result, the loss in hydraulic pressure or the friction loss caused by the supply of the hydraulic pressures becomes small. Thus, the fuel consumption of the internal combustion engine 1 which drives the hydraulic pump 10 can be reduced.

In FIGS. 10A to 10D, for convenience of the description, the input torque Tp to the primary pulley 11 and the rotation speed Np of the primary pulley 11 are depicted as increasing in a stepwise manner. In practice, however, the above-mentioned values do not increase instantaneously but increase within a certain time frame.

In the embodiment described above, the chain length L is calculated from the parameters indicating the operating state of the CVT 4, and the primary-pulley winding radius Rp is calculated from the chain length L. However, a map which defines the relationship between the parameters indicating the operating state of the CVT 4 and the primary-pulley winding radius Rp can be stored in the ROM of the transmission controller 22 so that the primary-pulley winding radius Rp is directly calculated from the parameters.

As described above, when the chain length L increases, the winding radius Rp of the V-chain 13 around the primary pulley 11 increases, whereas the slip limit thrust Fmin decreases. Therefore, as illustrated in FIG. 4, the transmission controller 22 performs the convergence calculation by iterating the process of calculating the chain length L again by using the decreased slip limit thrust Fmin and further calculating the slip limit thrust Fmin based on a new chain length L.

In order to reduce a computation load of the transmission controller 22 by the convergence calculation, a primary-pulley winding radius R' can be calculated in advance for the combination of the input torque Tp to the primary pulley 11, the actual speed ratio ip, and the rotation speed Np of the primary pulley 11 by the iterative calculation illustrated in FIG. 4 so that the result of calculation is stored as a map in the ROM of the transmission controller 22.

Figure 12:
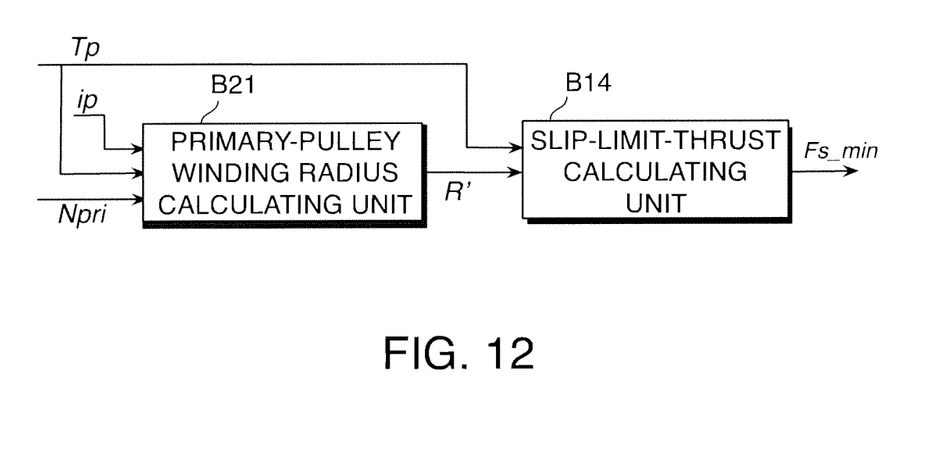
FIG. 12 is a block diagram illustrating a variation of a slip limit thrust calculating function of the transmission controller.

Referring to FIG. 12, by creating the map described above in advance, the chain-tension calculating unit B11, the chain-length calculating unit B12, and the primary-pulley winding radius calculating unit B13 of the transmission controller 22 illustrated in FIG. 4 can be replaced by a single primary-pulley winding radius calculating unit B21 as illustrated in FIG. 12. The slip-limit-thrust calculating unit B14 uses the primary-pulley winding radius R' and the input torque Tp to the primary pulley 11 searched from the map as in the case of FIG. 4 to calculate the slip limit thrust Fmin.

By creating the map of the primary-pulley winding radius R' described above, the convergence calculation can be omitted. Therefore, the computation load of the transmission controller 22 can be reduced.

In this embodiment, the case where the pulley stoppers 21A and 21B are provided to the primary pulley 11 while no pulley stopper is provided to the secondary pulley 12 has been described. However, even in the case where the pulley stoppers 21A and 21B are provided to the secondary pulley 12 while no pulley stopper is provided to the primary pulley 11, preferred results can be obtained by applying this invention. Specifically, in this case, the pulley thrust Fs for the secondary pulley 12 is ensured in the vicinity of the minimum speed ratio, whereas there is a risk that the pulley thrust for the primary pulley 11 becomes smaller than the slip limit thrust Fmin in the vicinity of the maximum speed ratio. In this case, the transmission controller 22 restricts the pulley thrust Fp for the primary pulley 11 with the slip limit thrust Fmin. However, when the V-chain 13 stretches, the winding radius Rp around the primary pulley 11 increases. As a result, the slip limit thrust Fmin decreases. By an accurate calculation of the slip limit thrust Fmin that decreases in accordance with the stretch of the V-chain 13 by the transmission controller 22, however, the pulley thrusts can be prevented from being excessively large while the occurrence of substantial slip of the V-chain 13 is prevented even in this case.

The contents of Tokugan 2011-030066, with a filing date of Feb. 15, 2011 in Japan, are hereby incorporated by reference.

Although the invention has been described above with reference to a certain embodiment, the invention is not limited to the embodiment described above. Modifications and variations of the embodiment described above will occur to those skilled in the art, within the scope of the claims.

INDUSTRIAL FIELD OF APPLICATION

By applying the speed ratio control device and the control method for a continuous variable transmission according to this invention to a vehicle driving system, precise speed ratio control without being affected by whether or not the endless torque transmission member stretches can be performed. Therefore, preferred effects for the improvement of vehicle driving performance are obtained.

The embodiments of this invention in which an exclusive property or privilege is claimed are defined as follows:

1. A speed ratio control device for a continuously variable transmission, wherein the continuously variable transmission comprises an endless torque transmission member looped around a pair of pulleys, one of the pulleys having a movable sheave configured to displace in an axial direction in accordance with an applied pulley thrust to change a winding radius of the endless torque transmission member, the speed ratio control device comprising:
   a sensor which detects an operating state of the continuously variable transmission; and
   a programmable controller programmed to:
      calculate a stretch amount of the endless torque transmission member based on the operating state of the continuously variable transmission, and a slip limit thrust in accordance with the stretch amount; and
      control the pulley thrust of the one of pulleys based on the slip limit thrust.

2. The speed ratio control device according to claim 1, wherein the controller is further programmed to calculate the slip limit thrust so that the slip limit thrust decreases as the stretch amount increases.

3. The speed ratio control device according to claim 1, wherein:
   the pair of pulleys includes a primary pulley for inputting a torque from exterior and a secondary pulley for outputting the torque to the exterior; and
   the operating state includes at least one of an input torque to the primary pulley, a pulley thrust applied to the secondary pulley, a rotation speed of the primary pulley, and an actual speed ratio of the primary pulley with respect to the secondary pulley.

4. The speed ratio control device according to claim 3, wherein the controller is further programmed to perform a convergence calculation of the slip limit thrust by repeating a process of calculating a length of the endless torque transmission member including the stretch amount, calculating the slip limit thrust from the length of the endless torque transmission member, re-calculating the length of the endless torque transmission member by using the slip limit thrust, and re-calculating the slip limit thrust again from a re-calculated length of the endless torque transmission member.

5. The speed ratio control device according to claim 2, wherein:
   each of the pair of pulleys comprises a movable sheave configured to displace in the axial direction in accordance with an applied pulley thrust;
   one of the pulleys comprises a stopper that restricts an axial displacement of the movable sheave beyond a predetermined limit against the applied pulley thrust; and
   the controller is further programmed to set the slip limit thrust calculated when the displacement of the movable sheave is restricted by the stopper to be equal to a slip limit thrust obtained at time when the movable sheave displaces to reach the stopper.

6. A speed ratio control method for a continuously variable transmission, wherein the continuously variable transmission comprises an endless torque transmission member looped around a pair of pulleys, one of the pulleys having a movable sheave configured to displace in an axial direction in accordance with an applied pulley thrust to change a winding radius of the endless torque transmission member, the speed ratio control method comprising:
   detecting an operating state of the continuously variable transmission;
   calculating a stretch amount of the endless torque transmission member based on the operating state of the continuously variable transmission, and a slip limit thrust in accordance with the stretch amount; and
   controlling the pulley thrust of the one of pulleys based on the slip limit thrust.

* * * * *